BEST AVAILABLE COPY

No. 12,571. REISSUED DEC. 4, 1906.

A. PEDERSEN.

PORTABLE ELECTRICALLY OPERATED DRILL.

APPLICATION FILED JUNE 25, 1906.

3 SHEETS—SHEET 1.

WITNESSES:

Jno. F. Oberlin

G. H. Baywell

INVENTOR:

Adolph Pedersen by his attorney

J. B. Fay

BEST AVAILABLE COPY

No. 12,571. REISSUED DEC. 4, 1906.

A. PEDERSEN.

PORTABLE ELECTRICALLY OPERATED DRILL.

APPLICATION FILED JUNE 25, 1906.

3 SHEETS—SHEET 2.

WITNESSES:

Jno. F. Oberlin

G. H. Saywell

INVENTOR:

Adolph Pedersen by his attorney

J. B. Fay

BEST AVAILABLE COPY

No. 12,571. REISSUED DEC. 4, 1906.

A. PEDERSEN.

PORTABLE ELECTRICALLY OPERATED DRILL.

APPLICATION FILED JUNE 25, 1906.

3 SHEETS—SHEET 3.

WITNESSES:

Jno. F. Oberlin

G. W. Saywell

INVENTOR:

Adolph Pedersen by his attorney

J. B. Fay

BEST AVAILABLE COPY

UNITED STATES PATENT OFFICE.

ADOLPH PEDERSEN, OF CLEVELAND, OHIO, ASSIGNOR TO THE VAN DORN-ELLIOTT ELECTRIC COMPANY, OF CLEVELAND, OHIO, A CORPORATION OF OHIO.

PORTABLE ELECTRICALLY-OPERATED DRILL.

No. 12,571. Specification of Reissued Letters Patent. Reissued Dec. 4, 1906.

Original No. 809,460, dated January 9, 1906. Application for reissue filed June 25, 1906. Serial No. 323,394.

*To all whom it may concern:*

Be it known that I, ADOLPH PEDERSEN, a citizen of the United States, and a resident of Cleveland, county of Cuyahoga, and State of Ohio, have invented a new and useful Improvement in Portable Electrically-Operated Drills, of which the following is a specification, the principle of the invention being herein explained and the best mode in which I have contemplated applying that principle so as to distinguish it from other inventions.

My invention relates to portable electrically-operated drills and other electrically-driven tools and machines, and especially to various combinations and subcombinations of the elements of the same, this invention referring especially to controlling mechanism adapted to control the motors used in machines of the above-mentioned character, as also to the construction of the handle used to guide the tool and to the relative arrangement and location of said handle, said controlling mechanism, and the means for actuating the latter.

Said invention consists of means hereinafter fully described, and specifically set forth in the claims.

The annexed drawings and the following description set forth in detail certain mechanism embodying the invention, such disclosed means constituting but one of various mechanical forms in which the principle of the invention may be used.

Figure 1:
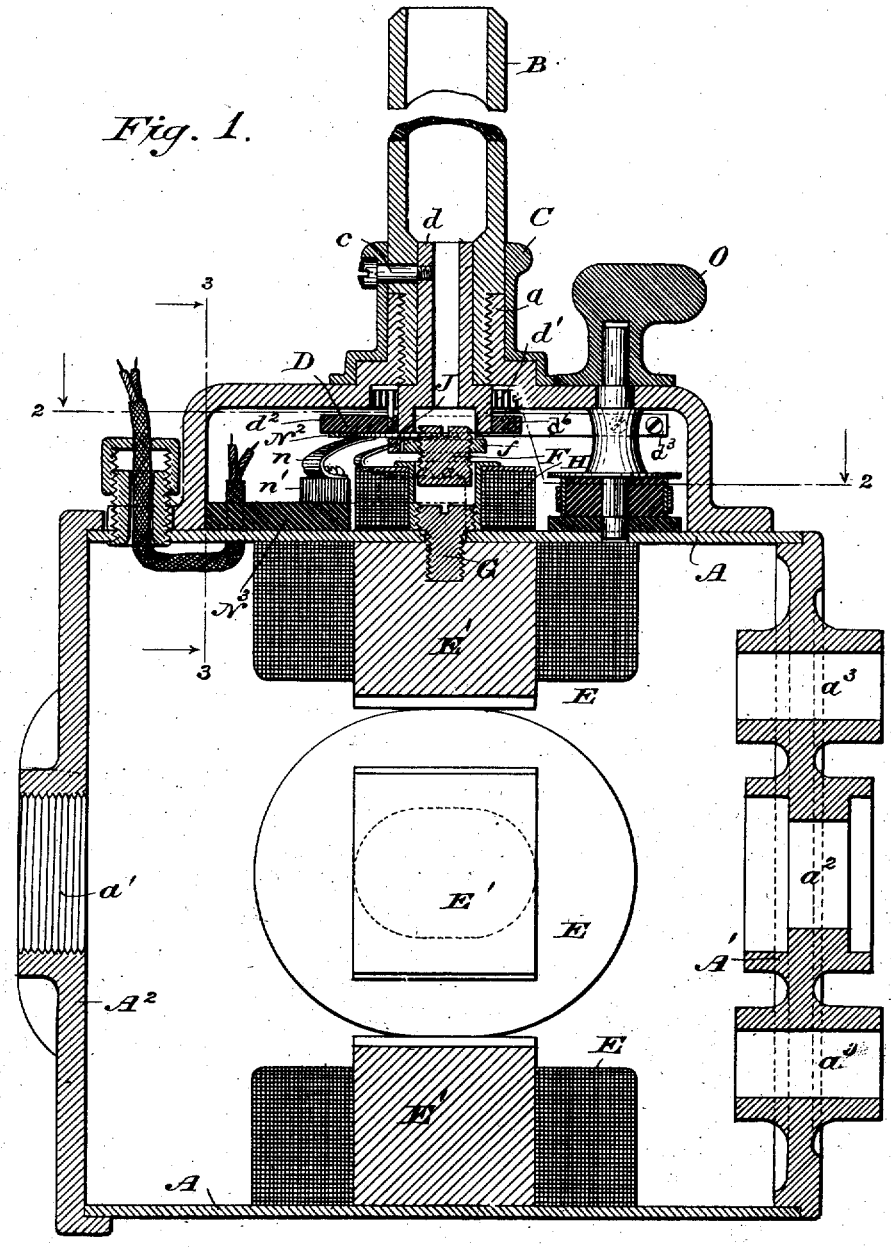
Figure 2:
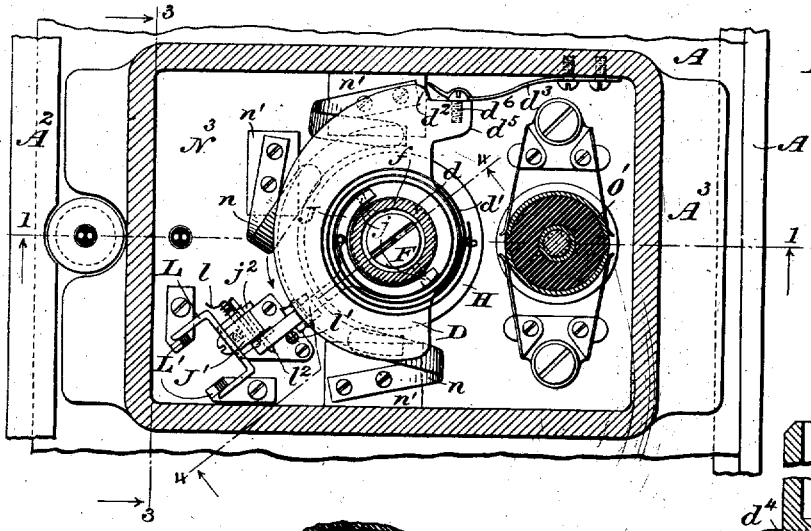
Figure 3:
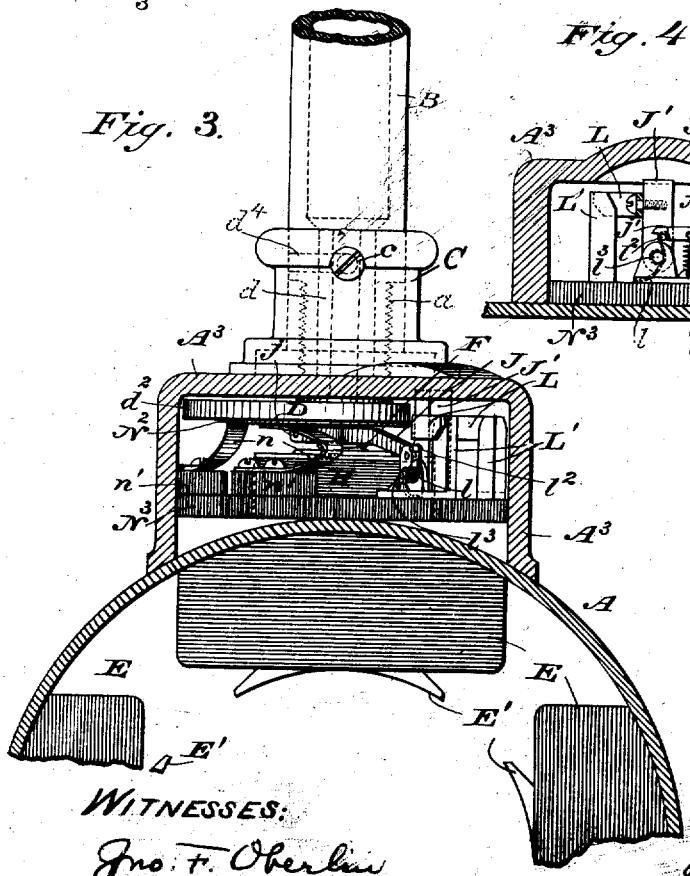
Figure 4:
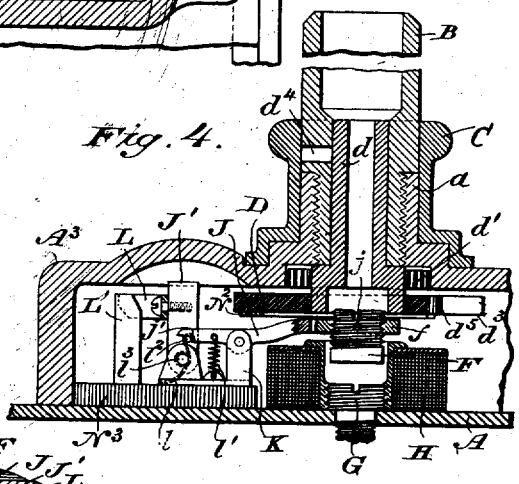
Figure 5:
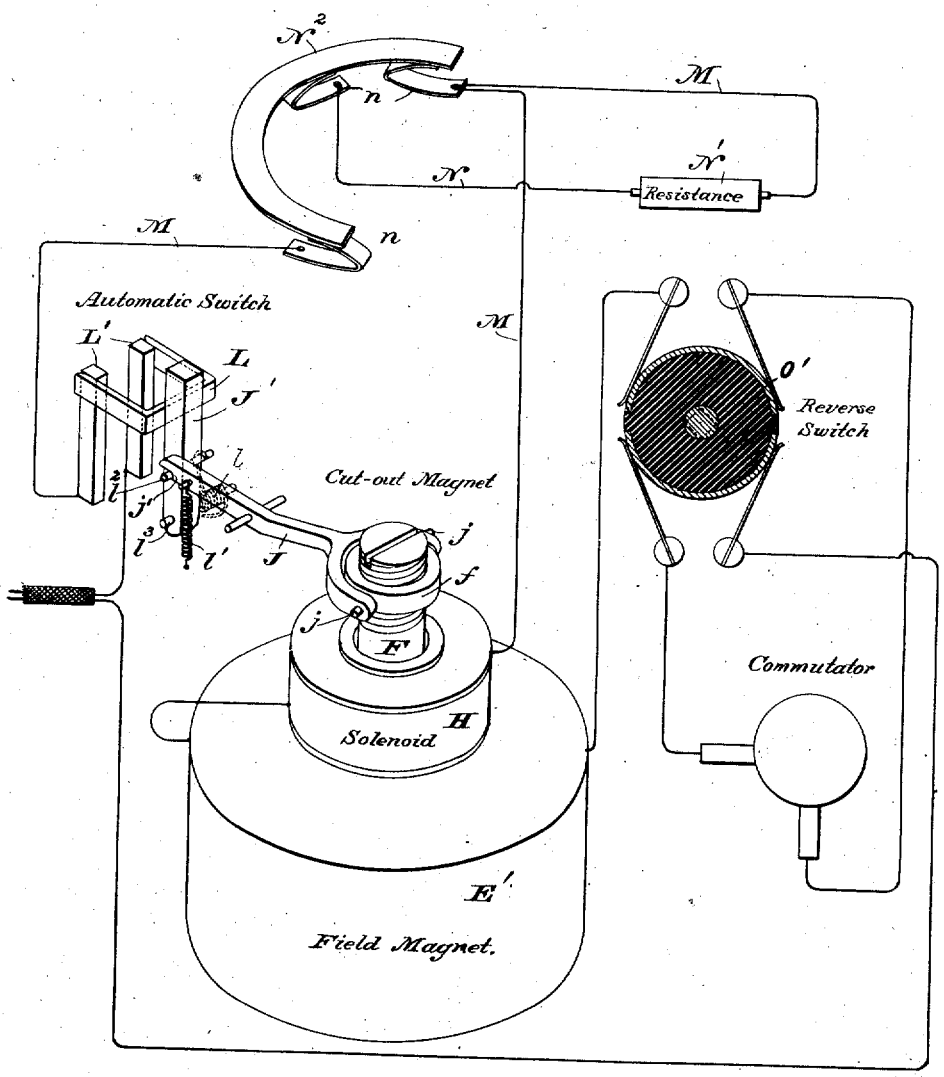

In said annexed drawings, Figure 1 represents a vertical axial section of my invention. Fig. 2 represents a horizontal section of the same, taken upon the planes indicated by the lines 2 2, Fig. 1, showing the controlling mechanism and some related parts in plan. Fig. 3 repesents a vertical section taken upon the plane indicated by the line 3 3, Figs. 1 and 2. Fig. 4 represents a vertical section taken upon the planes indicated by the lines 4 4, Fig. 2, plainly showing the relative arrangement of the drill-handle, the operating-sleeve, and the controlling mechanism; and Fig. 5 is a diagram illustrating the circuit connections.

My invention relates to the controlling apparatus of an electrically-driven tool or machine and to the construction of the handle thereof, as also to the relative arrangement and location of said handle, the operating-sleeve, and the controlling mechanism, and I have illustrated said invention in one of its uses as particularly applied to a portable electrically-operated drill, such as is described and claimed in United States Letters Patent No. 809,394, issued January 9, 1906, upon my invention in "electrically-operated portable drills."

As shown in the above-mentioned patent, I provide a suitable casing A for the drill and connected mechanism, such casing having an intermediate diaphragm A′ extending transversely across the same and an upper removable head or cap $A^2$ and a lateral removable portion $A^3$, within which is inclosed the controlling mechanism forming a part of the subject-matter of this invention. Within the casing A and suitably secured thereto are the four pole-pieces E′ of a field structure surrounding the armature E of a multipolar series-wound constant potential electric motor suitably secured to a motor-shaft. (Not shown.) The upper removable head $A^2$ is provided with a central aperture $a'$, having a screw-thread, and the diaphragm A′ has a central aperture $a^2$ in alinement with the aperture $a'$, and through said apertures the spindle of the drill and the feed-screw therefor are adapted to be inserted, as explained in my above-mentioned United States Letters Patent. Within the diaphragm A′ are suitable bearings $a^3$, in which are journaled pintles that carry upon their lower ends two pinions adapted to mesh with a gear-wheel (not shown) keyed upon the drill-spindle and upon their upper ends two pinions adapted to mesh with a gear-wheel (not shown) keyed upon the motor-shaft, all as is clearly shown and described in said United States Letters Patent.

The electrical drills that are at present in use are not adapted to general application in so far as I am aware, and the reason for this is as follows: It is usually desired that very rapid work be performed, and in order to accomplish this the drill must be forced to its work by some suitable manually-operated screw device. If the turning of the said feed-screw is effected by an inexperienced man, the normal proper speed of the motor is accelerated or retarded, and if the speed becomes

BEST AVAILABLE COP' too slow, such as when the drill is just breaking through the work, the armature not being able to revolve the drill will suddenly stop, and if the drill is not provided with fuses the machine will be immediately burned out. If the drill is provided with an ordinary circuit-breaker, the machine will not always be protected, for the operator soon discovers that he can defeat the object of the circuit-breaker and prevent it from operating by simply holding it down, thus causing the drill to do more work. I have sought to eliminate this trouble and provide a drill which is at all times reliable and proof against the carelessness or ignorance of an inexperienced man by providing the automatic controlling mechanism which will now be described in detail. The machine being series-wound and series-connected the magnetizing force will rise with the current, and by placing a small solenoid directly on the back of the field-core and connecting the same accumulative with the field-windings I am enabled to break the current at any time that the magnetic flux of the motor has reached a predetermined quantity. Of course no action would result if the solenoid were placed elsewhere and connected so as to oppose the field-windings to which it is connected.

I shall proceed to describe the drill-handle and the relative arrangement of the same with an operating-sleeve and the controlling mechanism, which forms an essential feature of my invention, such a handle being illustrated at B provided with a suitable outer screw-thread and adapted to be connected to an internally-screw-threaded integral projection $a$ upon the lateral portion $A^3$ of the casing. An operating-sleeve C surrounds the lower portion of the handle B and is rotatably secured, by means of a screw $c$, to the stem $d$ of an insulating semicircular switch-disk D, as plainly shown in Figs. 1 and 4, a suitable slot $d^4$, Fig. 4, being provided in the handle B, through which the screw $c$ may travel when the operating-sleeve C is actuated, thus making the handle B rigid with the drill-casing. By thus making the handle B immovable and also of quite a length and removing its outer end some distance from the operating-sleeve C the drill can be carried about by means of said handle and another handle (not shown) connected with the other side of the casing without any danger of accidentally revolving or disturbing the operating-sleeve C. Obviously this feature of actuating the controlling mechanism through a rigid handle by means of an operating element located exteriorly of the handle and connected with the controlling mechanism interiorly of the handle is of general application in tools or machines, and I do not intend herein to confine myself to its use in a portable electrically-driven drill, nor to the exact relative arrangement herein shown between said handle, operating means, and controlling mechanism, the broad feature being merely the control through a fixed handle.

I shall now describe the controlling mechanism, forming another essential feature of my invention.

As plainly shown in Fig. 1, a solenoid H is secured upon the core of one of the field-poles E′ by means of a screw G, formed out of a magnetic material, which is located within and under the influence of the magnetic field and assists the solenoid in pulling a screw F inwardly, which screw F serves as a cut-out magnet and forms the core of the solenoid and is adapted to be actuated when the magnetic flux of the motor has reached a predetermined quantity, such quantity being varied as desired, since the cut-out magnet F is adjustable by being screwed through a suspension-ring $f$, as plainly shown in Figs. 1, 4, and 5. Pivoted to this suspension-ring $f$ by means of pins $j$ is a forked magnet and switch-lever J, provided at its outer end with a shoulder $j'$, engaging with a pin $l^2$ when the cut-out magnet F is in its normal upward position, which pin $l^2$ is secured in an element J′, pivoted in ears $j^2$, projected upwardly from an insulated base $N^3$, supported upon the casing A. The lever J is pivoted in uprights K, also projected upwardly from the insulated base $N^3$. A spring $l$ tends to turn the element J′ upon its pivot $l^2$, but is normally prevented from so doing by the engagement of the pin $l^2$ with the shoulder $j'$, as plainly shown in Fig. 5. A second spring $l'$ serves to assist the weight of the lever J in holding the shoulder $j'$ to engagement with the pin $l^2$. The spring $l$ is a wound-wire spring and is adapted to throw out a knife-switch L, and thus break the circuit between the switch-poles L′, as plainly shown in Fig. 5, when the cut-out magnet F is drawn within the solenoid H and the shoulder $j'$ thus freed from the pin $l^2$. In Figs. 1 and 2 the insulating switch-disk D is shown in its full "on" position. Said switch-disk D is provided with a projection $d^2$, forming a cam-face, as clearly shown in Figs. 1, 2, 3, and 4, and when the operating-sleeve C is actuated to turn the switch-disk D to its "off" position, which would be in the direction of the arrow, Fig. 2, said cam-face $d^2$ contacts with the element J′ to move the same back to its normal upright position, as shown in Fig. 5, and the pin $l^2$ again engages with the shoulder $j'$, so as to hold said element J′ upright. The circuit is illustrated at M, Fig. 5, and within such circuit is introduced a shunt N, having a resistance N′, which shunt is rendered effective as follows: Secured to the under surface of the switch-disk D is a circular short-circuiting switch $N^2$, supported upon a plurality of contact-clips $n$, which in turn are secured to supports $n'$ upon the insulated base $N^3$. When the switch-disk D is in its full off position, the

BEST AVAILABLE COPY circuit is of course broken and is not again made until the switch-disk has been revolved sufficiently toward its full on position to bring the short-circuiting switch $N^2$ upon the two left-hand contact-clips $n$, Fig. 5, which passes the current through the shunt N until the forward end of the switch $N^2$ contacts with the right-hand clip $n$, thus passing the full current through the circuit. By thus introducing the shunt into the circuit I obviate the danger which is present when the full current is turned on all at once. A suitable reversing-switch O′ is provided, having an operating-handle O, adapted to be interlocked with the operating-sleeve C, said handle O being operative only when the sleeve C has been turned to hold the disk D in its off position. A suitable clock-spring $d'$, Figs. 1 and 2, is provided for holding the switch-disk D in its off position when not in use.

From the above description the operation of my invention, which is as follows, will be readily understood: The operating-sleeve C is actuated to turn the switch-disk D to its full on position, the current being applied gradually through the medium of the shunt N, and when the magnetic flux of the motor has reached a quantity which has been throught dangerous to the machine the cut-out magnet F is drawn inwardly by the solenoid H and the magnetic member G, thus releasing the pin $l^2$ from the shoulder $j'$, enabling the spring $l$ to pull the element J′ forwardly until it rests against the switch-disk D, carrying with it the knife-switch L, and thus breaking the current between the switch-poles L′. By turning the switch-disk D to its off position the element J′ is carried back by the cam-face $d^2$ of the switch-disk D and the pin $l^2$ engages with the shoulder $j'$, thus by the aid of the spring $l'$ holding the element J′ in its normal position when the switch-disk D is turned back to its full on position if the magnetic flux meanwhile has settled below the quantity which has been predetermined to be that at which the cut-out magnet F should be actuated. When the drill is in use, the switch-disk D is prevented from turning under the tension of the spring $d'$ by means of a spring-clip $d^3$, which is detachably hooked over a screw $d^6$, secured to a lug $d^5$ of the switch-disk D, as plainly shown in Fig. 2. When it is desired to revolve the switch-disk to its off position or to allow it to be thrown to said position by the spring $d'$, the operating-sleeve C can be turned with sufficient force to overcome the tension of the spring-clip $d^3$, and thus release the switch-disk D therefrom, as will be clearly seen.

Although I have shown and described the automatic switch and circuit-breaker comprising my motor-controller and the feature of a control through a fixed handle, together with the described relative arrangement of said handle, the controlling mechanism, and actuating means for the latter, as particularly applied to drills, still I wish it understood that they can be used upon any electrically-driven tool or machine where it is desired to provide compact and efficient mechanism of the character described.

Having thus described my invention in detail, that which I particularly point out and distinctly claim is—

1. In mechanism of the character described, the combination with an electric motor; of a circuit for its armature connections; means for automatically breaking said circuit when the magnetic flux of the motor reaches a predetermined quantity; and a manually-operable switch-disk adapted, when it is actuated to its "off" position, to close the break in the circuit made by said automatically-operating means.

2. In mechanism of the character described, the combination with an electric motor; of a circuit for its armature connections; means for automatically breaking said circuit when the magnetic flux of the motor reaches a predetermined quantity; a manually-operable switch-disk adapted, when it is actuated to its "off" position, to close the break in the circuit made by said automatically-operating means; and a short-circuiting switch included in said circuit and rendered operative during the actuation of said switch-disk to its "on" position.

3. In mechanism of the character described, the combination with an electric motor; of a circuit for its armature connections; a solenoid included in said circuit; circuit-breaking means adapted to be operated by the inward stroke of the core of said solenoid, such inward stroke of said core being effected when the magnetic flux of the motor reaches a predetermined quantity; a manually-operable switch-disk adapted, when it is actuated to its "off" position, to close the break in the circuit made by said circuit-breaking means; and means for effecting the outward stroke of said core.

4. In mechanism of the character described, the combination with an electric motor; of a circuit for its armature connections; a solenoid included in said circuit; circuit-breaking means adapted to be operated by the inward stroke of the core of said solenoid, such inward stroke of said co e being effected when the magnetic flux of the motor reaches a predetermined quantity; a manually-operable switch-disk adapted, when it is actuated to its "off" position, to close the break in the circuit made by said circuit-breaking means; means for effecting the outward stroke of said core; and a short circuiting switch included in said circuit, and rendered operative during the actuation of said switch-disk to its "on" position.

5. In mechanism of the character described, the combination with an electric mo-

BEST AVAILABLE COPY tor; of a circuit for its armature connections; means for automatically breaking said circuit when the magnetic flux of the motor reaches a predetermined quantity; a rotatory short-circuiting switch included in said circuit; a series of fixed contact-clips supporting said switch; manually-operable switching means adapted, when they are actuated to their "off" position, to close the break in the circuit made by said automatically-operating means, the actuation of said manually-operable switching means effecting the rotation of said short-circuiting switch, the latter contacting with said clips during the actuation of the switching means to their "on" position, so as to render said short circuit operative.

6. In mechanism of the character described, the combination with an electric motor; of a circuit for its armature connections; means for automatically breaking said circuit when the magnetic flux of the motor reaches a predetermined quantity, including a solenoid, a core therefor, a pivoted lever connected at one end to said core, a knife-switch, and switch-poles, said knife-switch held to engagement with the other end of said lever and held to contact with said switch-poles, when said core is in its outermost position; means for effecting the outward stroke of said core; and a manually-operable switch-disk adapted, when it is actuated to its "off" position, to close the break in the circuit made by said automatically-operating means.

7. In mechanism of the character described, the combination with an electric motor; of a circuit for its armature connections; means for automatically breaking said circuit when the magnetic flux of the motor reaches a predetermined quantity, including a solenoid, a core therefor, a pivoted lever connected at one end to said core, a knife-switch, and switch-poles, said knife-switch held to engagement with the other end of said lever, and held to contact with said switch-poles, when said core is in its outermost position; means for effecting the outward stroke of said core; a manually-operable switch-disk adapted, when it is actuated to its "off" position to close the break in the circuit made by said automatically-operating means; and a short-circuiting switch included in said circuit and rendered operative during the actuation of said switch-disk to its "on" position.

8. In mechanism of the character described, the combination with an electric motor; of a circuit for its armature connections; means for automatically breaking said circuit when the magnetic flux of the motor reaches a predetermined quantity, including a solenoid, an adjustable core therefor, a pivoted lever connected at one end to said core, a pivoted element held to engagement with the other end of said lever, when said core is in its outermost position, two switch-poles, and a knife-switch connected to said pivoted element and normally held by the latter to contact with said switch-poles; means for effecting the outward stroke of said core; and a manually-operable switch-disk adapted, when it is actuated to its "off" position, to close the break in the circuit made by said automatically-operating means.

9. In a portable electrically-operated drill, the combination of an electric motor provided with a suitable casing; a drill-spindle mounted in the latter; gearing connecting said motor and spindle; a manually-operable controller for said motor; and means for automatically actuating said controller to assume the "off" position when the magnetic flux of the motor reaches a predetermined quantity.

10. In a portable electrically-operated drill, the combination of an electric motor provided with a suitable casing; a drill-handle connected to the latter; and means for controlling the operation of the drill through said handle.

11. In a portable electrically-operated drill; the combination of an electric motor provided with a relatively stationary casing; a drill-handle; and means for controlling the operation of the drill through said handle.

12. In a portable electrically-operated drill, the combination of an electric motor provided with a casing, said casing supporting the field-windings of said motor; a drill-handle; and means for controlling the operation of the drill through said handle.

13. In a portable electrically-operated drill, the combination of an electric motor provided with a relatively stationary casing; a drill-handle; and means for controlling the motor through said handle, and independently of the latter.

14. In a portable electrically-operated drill, the combination of an electric motor provided with a casing, said casing supporting the field-windings of said motor; a drill-handle; and means for controlling the motor through said handle and independently of the latter.

15. In a portable electrically-operated drill, the combination of an electric motor provided with a suitable casing; a drill-handle connected to the latter; and means for controlling the motor through said handle and independently of the latter.

16. In a portable electrically-operated drill, the combination of an electric motor provided with a suitable casing; a drill-handle fixed to the latter; and means for controlling the operation of the drill through said handle.

17. In a portable electrically-operated drill, the combination of an electric motor provided with a casing, said casing supporting the field-windings of said motor; a drill-

BEST AVAILABLE COPY handle fixed to said casing; and means for controlling the operation of the drill through said handle.

18. In a portable electrically-operated drill, the combination of an electric motor provided with a suitable casing; a drill-handle connected to the latter; means located within said handle for controlling the operation of the drill; and means located exteriorly of said handle for actuating said controlling means.

19. In a portable electrically-operated drill, the combination of an electric motor provided with a relatively stationary casing; a drill-handle; means located interiorly of said handle for controlling the motor; and means located exteriorly of said handle for actuating said controlling means.

20. In a portable electrically-operated drill, the combination of an electric motor provided with a suitable casing, a drill-handle fixed to the latter; means located within said handle for controlling the operation of the drill; and means located exteriorly of said handle for actuating said controlling means.

21. In a portable electrically-operated drill, the combination of an electric motor provided with a casing, said casing supporting the field-windings of said motor; a drill-handle; means located interiorly of said handle for controlling the motor; and means located exteriorly of said handle for actuating said controlling means, said actuating and said controlling means being adapted to be operated independently of said handle.

22. In a portable electrically-operated drill, the combination of an electric motor provided with a suitable casing; a drill-handle connected to the latter; a controller for said motor located within said casing and provided with a stem extending within said handle; and means located exteriorly of said handle and rotatably secured to said stem.

23. In a portable electrically-operated drill, the combination of an electric motor provided with a suitable casing; a drill-handle connected to the latter; a controller for said motor located within said casing and provided with a stem extending within said handle; and a sleeve mounted exteriorly of said handle and rotatably secured to said stem.

24. In a portable electrically-operated drill, the combination of an electric motor provided with a suitable casing; a drill-handle fixed to the latter; a controller for said motor located within said casing and provided with a stem extending within said handle; and means located exteriorly of said handle and rotatably secured to said stem.

25. In a portable electrically-operated drill, the combination of an electric motor provided with a suitable casing; a drill-handle fixed to the latter; a drill-spindle mounted in said casing; gearing connecting said motor and spindle; a controller for said motor located within said casing and provided with a stem extending within said handle; and a sleeve mounted exteriorly of said handle and rotatably secured to said stem.

26. In a portable electrically-operated drill, the combination of an electric motor provided with a suitable casing; a lateral inclosing portion connected to said casing; a drill-handle connected to said lateral portion; a controller for said motor located within said lateral portion; and means for actuating said controller through said handle.

27. In a portable electrically-operated drill, the combination of an electric motor provided with a suitable casing; a lateral inclosing portion connected to said casing; a drill-handle connected to said lateral portion; a controller for said motor located within said lateral portion; and means located exteriorly of said handle and rotatably secured to said controller.

28. In a portable electrically-operated drill, the combination of an electric motor provided with a suitable casing; a lateral inclosing portion connected to said casing; a drill-handle connected to said lateral portion; a controller for said motor located within said lateral portion; and a sleeve located exteriorly of said handle and rotatably secured to said controller.

29. In a portable electrically-operated drill, the combination of an electric motor provided with a suitable casing; a lateral inclosing portion connected to said casing; a drill-handle fixed to said lateral portion; a controller for said motor located within said lateral portion; and means located exteriorly of said handle and rotatably secured to said controller.

30. In a portable electrically-operated drill, the combination of an electric motor provided with a suitable casing; a drill-spindle mounted in the latter; gearing connecting said motor and spindle; a lateral inclosing portion connected to said casing; a drill-handle fixed to said lateral portion; a controller for said motor located within said lateral portion; and a sleeve located exteriorly of said handle and rotatably secured to said controller.

31. In a portable electrically-operated drill, the combination of an electric motor provided with a suitable casing; a drill-spindle mounted in the latter; gearing connecting said motor and spindle; a lateral inclosing portion secured to said casing; a handle screw-threaded to said lateral portion; a controller for said motor located within said lateral portion and provided with a stem extending within said handle; and a sleeve mounted exteriorly of said handle and rotatably secured to said stem.

BEST AVAILABLE COP'

32. In a portable electrically-operated drill, the combination of an electric circuit and a motor therein provided with a suitable casing; a drill-handle connected to the latter; means for controlling the operation of the drill through said handle; and means for automatically breaking said circuit when the magnetic flux of the motor reaches a predetermined quantity.

33. In a portable electrically-operated drill, the combination of an electric circuit and a motor therein provided with a suitable casing; a drill-handle fixed to the latter; means for controlling the operation of the drill through said handle; and means for breaking said circuit when the magnetic flux of the motor reaches a predetermined quantity.

34. In a portable electrically-operated drill, the combination of an electric circuit and a motor therein provided with a suitable casing; a drill-handle and a drill-spindle connected to the latter; gearing connecting said motor and spindle; means located within said handle for controlling the operation of the drill; means located exteriorly of said handle for actuating said controlling means; and means for automatically actuating said controlling means to assume the "off" position when the magnetic flux of the motor reaches a predetermined quantity.

35. In a portable electrically-operated drill, the combination of an electric circuit and a motor therein provided with a suitable casing; a drill-handle fixed to the latter; a controller for said motor located within said handle; manually-operable means located exteriorly of said handle for actuating said controller; and automatically-operating means for actuating said controller to assume the "off" position when the magnetic flux of the motor reaches a predetermined quantity.

36. In a portable electrically-operated drill, the combination of an electric circuit and a motor therein provided with a suitable casing; a drill-handle fixed to the latter; a drill-spindle mounted in said casing; gearing connecting said motor and spindle; a controller for said motor located within said casing and provided with a stem extending within said handle; a sleeve mounted exteriorly of said handle and rotatably secured to said stem; and means for actuating said controller to assume the "off" position when the magnetic flux of the motor reaches a predetermined quantity.

37. In a portable electrically-operated drill, the combination of an electric circuit and a motor therein provided with a suitable casing; a lateral inclosing portion secured to said casing; a drill-handle connected to said lateral portion; a controller for said motor located within said lateral portion; means for actuating said controller through said handle; and means for automatically breaking said circuit when the magnetic flux of the motor reaches a predetermined quantity.

38. In a portable electrically-operated drill, the combination of an electric circuit and a motor therein provided with a suitable casing; a drill-spindle mounted in the latter; gearing connecting said motor and spindle; a lateral inclosing portion secured to said casing; a handle screw-threaded to said lateral portion; a controller for said motor located within said lateral portion and provided with a stem extending within said handle; a sleeve mounted exteriorly of said handle and rotatably secured to said stem; and means for automatically actuating said controller to assume the "off" position when the magnetic flux of the motor reaches a predetermined quantity.

Signed by me this 20th day of June, 1906.

ADOLPH PEDERSEN.

Attest:

JNO. F. OBERLIN,
G. W. SAYWELL.